United States Patent [19]

Inada et al.

[11] Patent Number: 4,664,333
[45] Date of Patent: May 12, 1987

[54] WEBBING FOR SEATBELT SYSTEM

[75] Inventors: Yasuo Inada; Koki Sato, both of Aichi; Takazo Fujii, Gifu; Hideo Yokoyama, Gifu; Shoichi Takahashi, Gifu; Kiyoshi Mizutani; Takayoshi Kawashima, both of Aichi; Akira Nagawa, Niigata, all of Japan

[73] Assignee: Kabushiki Kaisha Toka-rika-denki-seisakusho, Aichi, Japan

[21] Appl. No.: 780,296

[22] Filed: Sep. 26, 1985

[30] Foreign Application Priority Data

Sep. 28, 1984 [JP] Japan .................. 59-146739

[51] Int. Cl.⁴ .................. B60R 22/36; D03D 25/00
[52] U.S. Cl. .................. 242/107.4 A; 139/383 R
[58] Field of Search .......... 242/107, 107.4 R–107.4 E; 139/383 R, 420 R, 426 R, 426 TW

[56] References Cited

U.S. PATENT DOCUMENTS

| | | | |
|---|---|---|---|
| 2,788,023 | 4/1957 | Renaud | 139/420 R |
| 3,322,163 | 5/1967 | Hughes | 139/383 R |
| 3,872,895 | 3/1975 | Takada | 139/383 R |

Primary Examiner—John M. Jillions
Attorney, Agent, or Firm—Sixbey, Friedman & Leedom

[57] ABSTRACT

An occupant restraining webbing employed in a seatbelt system for a vehicle includes warp which has a dry tenacity of 8.8 gr/De or more, a thickness of 1,700 De or less and a twist multiplier of 3,100 to 5,500. Thus, it is possible to reduce the extra amount by which the webbing is undesirably wound off after the rotation of a takeup shaft for winding off the webbing from a webbing retractor has ceased.

10 Claims, 7 Drawing Figures

WEBBING FOR SEATBELT SYSTEM

BACKGROUND OF THE INVENTION

1. Field of the Invention

The present invention relates to a webbing for use in a seatbelt system designed to protect an occupant of a vehicle when an emergency situation occurs, the webbing being adapted to restrain the occupant at the time of a vehicular emergency.

2. Description of the Prior Art

A typical seatbelt system is arranged such that an occupant is fastened by a webbing and is restrained by the latter when a vehicular emergency situation occurs.

In general, one end portion of the webbing is wound up onto a takeup shaft of a webbing retractor by means of biasing force, whereby it is possible for the occupant to be tightly fastened by the intermediate portion of the webbing by means of the tension generated in the webbing. The webbing retractor is provided with an inertia type lock mechanism which stops the wind-off of the webbing at the time of a vehicular emergency. Thus, when an emergency situation occurs, the wind-off of the webbing is stopped, and the occupant is thereby brought into a webbing restrained condition.

In such a case, however, even after the takeup shaft has been stopped from rotating so that the webbing ceases to be wound off, the webbing may be undesirably wound off because the portion of the webbing which is wound on the takeup shaft in layers is tightened by the force of inertia acting on the body of the occupant. The extra amount by which the webbing is wound off in this case is preferably below a given value.

SUMMARY OF THE INVENTION

In view of the above-described circumstances, it is a primary object of the present invention to provide a webbing for a seatbelt system which enables reduction in the amount by which the webbing is wound off after the webbing wind-off rotation of the takeup shaft has been suspended.

To this end, the invention provides a webbing for a seatbelt system which is formed by weaving together warp and weft, the warp being constituted by a polyester yarn which has a dry tenacity (yarn strength) of 8.8 gr/De or more, a denier of 1,700 De or less and a twist multiplier of 3,100 to 5,500.

The amount of the webbing wound off after the wind-off rotation of the takeup shaft has been suspended in response to the inertia acting on the body of the occupant when an emergency situation occurs varies by a large margin depending upon the webbing weaving specifications, particularly the warp specifications. More specifically, the undesirable wind-off of the webbing, which results from the tightening of the portion of the webbing wound up on the takeup shaft in layers, is mainly caused by a change in the roll diameter of the webbing on the takeup shaft in accordance with the compressive resistance of the webbing in the direction of its thickness.

In the present invention, the denier and the number of twists of the warp are appropriately specified so as to obtain a webbing which has excellent compressive resistance, that is, a webbing which enables minimization of the amount of webbing undesirably wound off at a time of an emergency situation. The twist multiplier of the warp is set at 3,100 to 5,500, preferably 3,500 to 5,500. A twist multiplier in excess of 5,500 increases production costs and is therefore not preferable.

Although there has been a conventional webbing employing a twisted warp, the purpose of twisting the warp in the prior art is to improve the wear resistance and the weaving characteristic; hence, the warp has a relatively small twist multiplier, such as about 2,000 to 3,000. When the warp is twisted for the purpose of improving the wear resistance and the weaving characteristic, it is not necessary to employ a twist multiplier of 3,000 or more. If the twist multiplier is set at 3,000 or more, the weaving characteristic may be deteriorated by possible untwisting of the warp. For this reason, no twisted warp having a twist multiplier of 3,000 or more has heretofore been employed.

Assuming now that the overall denier of warp yarns is 360,000 to 490,000, the total number of required warp yarns is 360 to 490 for a warp yarn of 1,000 De, 240 to 330 for a warp yarn of 1,500 De, and 218 to 288 for a warp yarn of 1,700 De.

The elongation of the warp is preferably 4 to 8%, and the count of weft yarns therefor is 19/inch or less. When the weft rigidity and the stability and abrasion resistance of the texture are taken into consideration, it is necessary for the count of weft yarns to be 15/inch.

BRIEF DESCRIPTION OF THE DRAWINGS

The above and other objects, features and advantages of the present invention will become more apparent from the following description of the preferred embodiment thereof, taken in conjunction with the accompanying drawings, in which like reference numerals denote like elements, and in which.

DESCRIPTION OF THE PREFERRED EMBODIMENT

Figure 1:
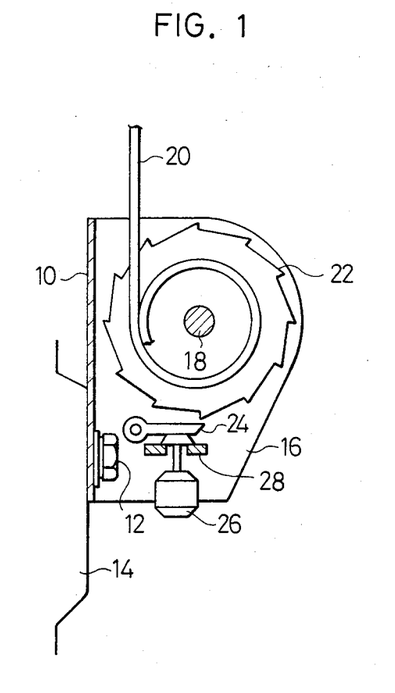
FIG. 1 is a sectional view of a webbing retractor to which one embodiment of the webbing for a seatbelt system according to the present invention is applied.

FIG. 1 shows a webbing retractor to which one embodiment of the present invention is applied.

The webbing retractor has a frame 10 secured to a vehicle body 14 by means of a bolt 12. Two side portions of the frame 10 are bent at right angles in such a manner as to provide a pair of parallel leg plates 16 (only one of them is shown in FIG. 1). A takeup shaft 18 is rotatably supported by these leg plates 16.

One end portion of an occupant restraining webbing 20 is retained by the central portion of the takeup shaft 18 and is wound up thereon in layers. The other end portion (not shown) of the webbing 20 is retained by the vehicle body 14, and the intermediate portion of the webbing 20 is employed as an occupant fastening portion.

A spiral spring is interposed between the takeup shaft 18 and one of the leg plates 16 in such a manner that the takeup shaft 18 is subjected to biasing force so as to rotate in the direction in which the webbing 20 is wound up. A ratchet wheel 22 is secured to the takeup shaft 18, and a pawl 24 which is pivotally supported by the leg plates 16 opposes the ratchet wheel 22. The pawl 24 is placed on a pendulum 26 which is suspended from the leg plates 16 through a bracket 28.

Accordingly, when the vehicle accelerates, the pendulum 26 tilts, and the pawl 24 is thereby pushed up and engaged with the ratchet wheel 22, thereby suspending the rotation of the takeup shaft 18 in the direction in which the webbing 20 is wound off. Thus, the ratchet wheel 22, the pawl 24 and the pendulum 26 constitute in combination an inertia type lock mechanism.

The webbing 20 produced in accordance with this embodiment is capable of displaying a desirable restraining performance without any risk of the webbing being wound off by a disadvantageously large amount even when the pendulum 26 causes the pawl 24 to engage with the ratchet wheel 22 in order to suspend the rotation of the takeup shaft 18 at the time of a vehicular emergency situation.

The following is a description of the webbing 20.

The properties of the warp which constitutes part of the webbing 20 will first be explained in detail.

A sectional view of a webbing taken along its lateral axis reveals an arrangement in which the warp yarns are disposed on both sides of the weft. The percentage of the overall denier of the weft yarns in relation to the whole number of yarns constituting the webbing is smaller than that of the warp yarns, i.e., on the order of 7 to 20% in general. Since the weft is already compressed between the warp yarns when the webbing is woven, the warp yarns are mainly changed in thickness by the compression which may take place when the webbing is actually used.

It is found from the comparison between warp yarns which have a relatively large denier and those which have a relatively small denier that the warp yarns having a relatively small denier easily fill gaps in the webbing which may be defined between the warp yarns adjacent to each other and are therefore tightly woven to provide a webbing which has a high filling density and hardly varies in thickness when compressed. The cross-section of each warp yarn is not strictly circular, and the warp yarns are woven with various shapes so that possible air gaps are filled thereby. It is therefore possible for the air gaps to be filled to a certain extent.

More specifically, in order to obtain a webbing which shows hardly any variation in thickness during compression, it is necesary to set the denier of each warp yarn at such a value that the air gap between two adjacent warp yarns is adequately filled.

The inventors of the present invention have experimentally obtained an optimal denier for each warp yarn. Since a primary object of the present invention is to provide an occupant restraining webbing which enables reduction in the extra amount of wound-off webbing, it is necessary to select a polyester webbing which has a relatively low elongation limit. Further, the webbing according to the present invention must have the same specifications as those of ordinary webbings (having a strength of 2,800 to 3,350 kgf, an elongation of 4 to 8% and a width of 48 to 50 mm). In addition, the overall denier of the warp yarns obtained by the present yarn manufacturing technique and weaving technique must be on the order of 360,000 to 490,000 De.

Figure 2:
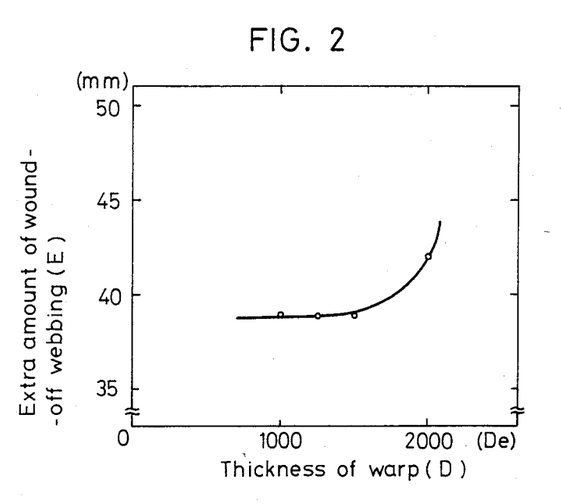
FIG. 2 is a graph which shows the relationship between the denier (D) of warp and the extra amount (E) by which the webbing is undesirably wound off.

With a webbing which satisfies the above-described conditions, an inflection point at which the extra amount of wound-off webbing (E) starts to increase was obtained by varying the denier (D) of the warp yarns. As a result, it has been found that the extra amount of wound-off webbing (E) starts to increase around a warp yarn denier of 1,500 De, as shown in FIG. 2. This inflection point, as a matter of course, varies depending upon the overall denier of the warp yarns for a given width of the webbing. However, the inflection point has no substantial change within a range of the order from 360,000 to 490,000 De.

Figure 7:
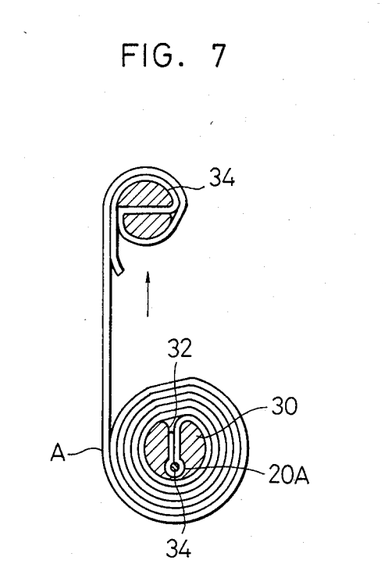
FIG. 7 is a sectional view of equipment for measuring the extra amount by which the webbing is undesirably wound off.

FIG. 7 shows equipment for measuring the extra amount of wound-off webbing (E) of the graph shown in FIG. 2. A slit 32 is formed in a fixed metal rod 30 (with a length of 58 mm) having a diameter of 31 mm in such a manner that the slit 32 extends radially through the axial center of the rod 30. A loop portion 20A which is formed at one end of the webbing 20 (with a width of 49 mm) is inserted into the slit 32. A pin 34 is inserted into the loop portion 20A in order to prevent the loop portion 20A from coming out of the slit 32. The webbing 20 is wound 5.75 turns on the outer periphery of the metal rod 30 under a constant tension of 0.7 kg. The webbing 20 is then drawn out and retained by a chuck 34.

The chuck 34 is spaced from the metal rod 30 by 220 mm and is pulled away from the metal rod 30 at a tensile force of 800 kg and a pulling rate of 30 mm/min. The amount of movement of the point A is shown in the graph of FIG. 2.

It is to be noted that the webbing 20 is placed in an atmosphere where the temperature is 22±2° C. and the relative humidity is 65±5% for 24 hours before the measurement.

When the measurement was effected to obtain the results shown in FIG. 2, the total number of warp yarns was set for each individual measurement while varying the denier of warp yarns so that the overall denier is maintained at 425,000 De, and the twist multiplier was standardized at 3,350. In consequence, the strength was substantially constant, i.e., 3,200 kg of force. The count of weft yarns was 17.5/inch., and each weft yarn has a denier of 630 De. The elongation of the webbing 20 was 5% under 1,130 kg of force.

It will be understood from FIG. 2 that it is necessary to set the denier of the warp at 1,700 De or less.

The following is a description of the number of twists.

The inventors of the present invention have succeeded in obtaining a webbing which enables reduction in the extra amount of wound-off webbing by increasing the number of twists, which has heretofore been defined with the purpose of improving wear resistance, in consideration of the fact that the extra amount of wound-off webbing is related to the compressive resistance of the warp.

More specifically, the degree of twisting is generally expressed by the twist multiplier as follows:

$$\text{Twist multiplier } (x) = \text{Number of twists} \times \sqrt{\text{Denier (thickness)}} \quad (1)$$

Figure 3:
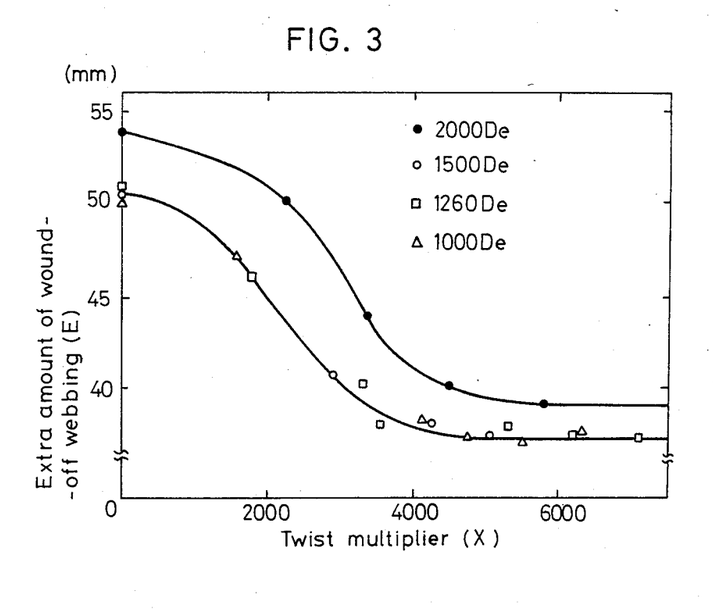
FIG. 3 is a graph which shows the relationship between the twist multiplier (x) and the above-described extra amount (E) of the webbing.

The relationship between the twist multiplier (x) and the extra amount of wound-off webbing (E) is such as that shown in FIG. 3. The results shown in the graph of FIG. 3 were measured by employing the equipment shown in FIG. 7. The total number of warp yarns was set for each measurement by varying the thickness of each warp yarn and the twist multiplier while maintaining the overall denier at 425,000 De. It is to be noted that the weft specifications and the elongation and width of the webbing were similar to those in the case of FIG. 2.

It will be understood from FIG. 3 that increasing the twist multiplier (x) enables the extra amount of wound-off webbing (E) to be reduced. However, when the twist multiplier (x) becomes higher than 5,000, the extra amount of wound-off webbing (E) is substantially constant.

Further, as will also be understood from the trend of the curve shown in FIG. 2, the respective absolute values of the extra amounts of wound-off webbing in relation to yarns of 1,500 De and less are on the same level, while a denier of 2,000 De which exceeds the inflection point involves a relatively high extra amount of wound-off webbing, as mentioned in the description of the denier of the warp yarns.

It is found from FIGS. 2 and 3 that it is sufficient in order to obtain a webbing which involves a small extra amount of wound-off webbing to employ warp yarns with a denier of 1,500 De or less and to set the twist multiplier at about 5,000.

However, as already described, the extra amount of wound-off webbing depends on the amount of change in the thickness of the webbing, that is, a webbing having a smaller thickness involves a smaller extra amount of wound-off webbing. The thickness of a webbing is mainly determined by the overall denier of the warp yarns, and the strength of the webbing is related to the thickness. As the twist multiplier is increased, the yarn strength is lowered, and the webbing strength is consequently lowered. If the total number of warp yarns is increased in order to compensate for the reduction in strength, the thickness of the webbing is increased, thus causing an increase in the extra amount of wound-off webbing.

In other words, the relationship between the twist multiplier and the extra amount of wound-off webbing under the condition of a constant webbing strength differs from that shown in FIG. 2.

Figure 4:
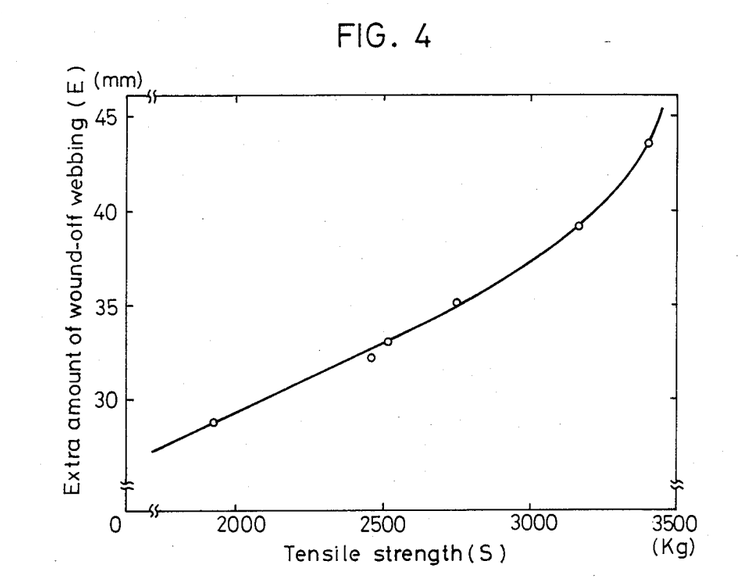
FIG. 4 is a graph which shows the relationship between the tensile strength (S) of the webbing and the above-described extra amount (E)
Figure 5:
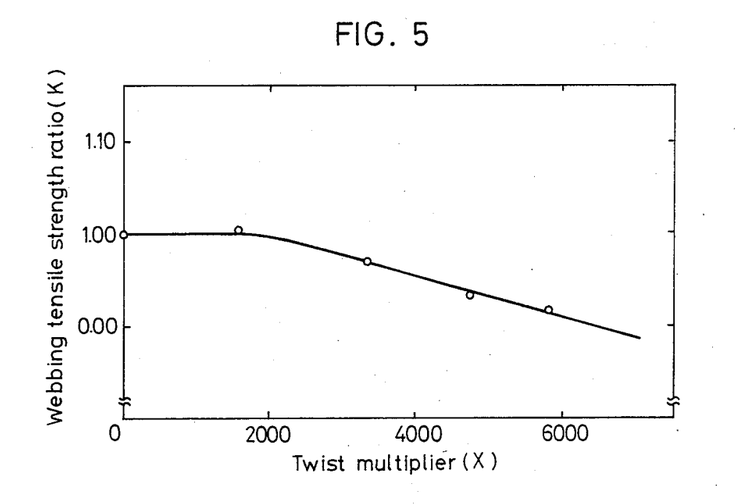
FIG. 5 is a graph which shows the relationship between the twist multiplier (x) and the webbing tensile strength ratio (k)

To examine the above-described relationship, the relationship between the webbing strength (S) and the extra amount of wound-off webbing (E) and that between the twist multiplier (x) and the rate of reduction in the webbing strength (the webbing tensile strength ratio k) were obtained and are respectively shown in FIGS. 4 and 5.

The results shown in FIG. 4 were measured by employing the equipment shown in FIG. 7. As to the warp specifications, the total number of warp yarns was changed while maintaining the denier of each warp yarn at 1,000 De. The twist multiplier was standardized at 3,350. The weft specifications and the elongation and width of the webbing were similar to those in the case of FIG. 2.

The webbing tensile strength ratio k represents the ratio of the webbing tensile strength of twisted warp yarns to that of non-twisted warp yarns.

It is now assumed that the respective functions of the curves shown in FIGS. 3 to 5 are $E = f(x)$, $E = g(s)$ and $k = h(x)$. By compensating for a reduction in the webbing strength due to twisting, that is, by increasing the overall denier of the warp yarns in order to maintain the webbing strength at the same level as that of a webbing of non-twisted warp yarns, the increment $E'$ of the extra amount of wound-off webbing is given as follows:

$$E' = g(S_0) - g[S_0 \times h(x)] \quad (2)$$

where $S_0$ represents the webbing tensile strength of a webbing of non-twisted warp yarns. Hence, the expression of relation between E and x under the condition of a constant webbing strength is given as follows:

$$E = f(x) + E' = f(x) + g(S_0) - g[S_0 + h(x)] \quad (3)$$

Figure 6:
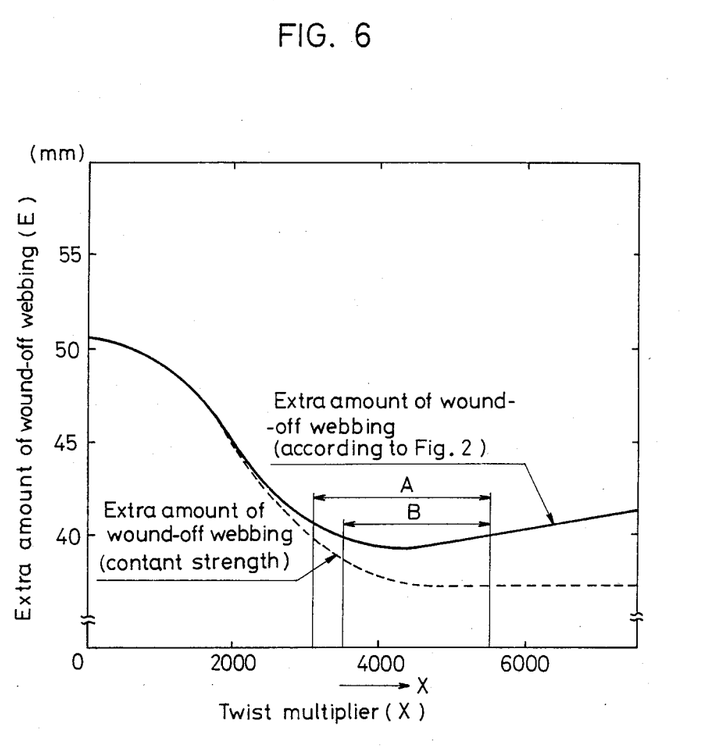
FIG. 6 is a graph which shows the relationship between the twist multiplier (x) and the above-described extra amount (E) of the webbing under conditions of constant strength.

This relationship is shown in FIG. 6. As will be understood from the graph shown in FIG. 6, a webbing which involves the smallest extra amount of wound-off webbing is obtained at a twist multiplier of around 4,000, that is, 3,100 to 5,500 (within the range A in FIG. 6), preferably 3,500 to 5,500 (within the range B in FIG. 6).

On the basis of the above, a webbing was manufactured by way of trial in accordance with the following specifications.

| Warp yarn: | thickness | 1,000 De |
|---|---|---|
| | Number of filaments | 192 |
| | Twist multiplier | 4,110 |
| | (Number of twists | 130 T/m) |
| | Total number | 400 |
| Weft yarn: | Thickness | 630 De |
| | Number of filaments | 72 |
| | Count of weft yarns | 17.5/inch |
| Strength: | 3,000 kg | |
| Elongation: | 5% | |
| Width: | 49 mm | |

The extra wound-off amount of the webbing manufactured in accordance with the above specifications was measured by employing the equipment shown in FIG. 7. The result was E = 36 mm, which is remarkably low compared with the equivalent value for an ordinary webbing of non-twisted warp yarns, that is, E = 50 mm.

This trial webbing was compared with a conventional non-twisted webbing in terms of dynamic performance. A collision test was carried out under the following conditions: each webbing was employed in a three-point seatbelt system mounted in a typical small-sized car; the amount of webbing wound up into the webbing retractor was 700 mm; the collision speed was 35 mile/hour; and the collision acceleration value was 26 G. The results of measurement of the extra amount of wound-off webbing in this test are shown in Table 1 below.

TABLE 1

| | Conventional non-twisted webbing | Trial product of the invention | Difference between movements |
|---|---|---|---|
| Extra wound-off amount of webbing portion at retractor | 60 mm | 48 mm | −12 mm |
| Amount of movement of dummy head | 340 mm | 318 mm | −22 mm |
| Amount of movement of | 172 mm | 159 mm | −13 mm |

TABLE 1-continued

|  | Conventional non-twisted webbing | Trial product of the invention | Difference between movements |
|---|---|---|---|
| dummy breast Amount of movement of dummy waist | 124 mm | 112 mm | −12 mm |

In Table 1, the extra wound-off amount of the webbing portion at the retractor is larger than the aforementioned static extra wound-off amount because the value shown in Table 1 includes the extra amount of wound-off webbing added due to the torsion or the like of the takeup shaft of the retractor. Further, the amount of each movement of the dummy represents the maximum amount of movement in the direction in which the car was moving when it collided.

As has been described above, the webbing for a seatbelt system according to the present invention is formed by weaving together warp and weft, the warp being constituted by a polyester yarn which has a dry tenacity of 8.8 gr/De or more, a thickness of 1,700 De or less and a twist multiplier of 3,100 to 5,500. The webbing of the present invention advantageously enables reduction in the amount by which the webbing is undesirably wound off after the rotation of the takeup shaft for winding off the webbing has been suspended.

What is claimed is:

1. An improved occupant restraining webbing employed in a seatbelt system for a vehicle of the type having a warp and weft woven from polyester yarn, and having a strength between about 2,800 to 3,350 kgf, wherein yarn forming the warp has the following specifications:
   (a) a dry tenacity of 8.8 gr/De or more;
   (b) a denier of 1,700 De or less; and
   (c) a twist multiplier of 3,100 to 5,500, whereby it is possible to reduce the extra amount of webbing that undesirably winds off in an emergency vehicular situation.

2. An occupant restraining webbing according to claim 1, wherein said twist multiplier is preferably 3,500 to 5,500.

3. An occupant restraining webbing according to claim 1, wherein the elongation of said warp is 4 to 8%.

4. An occupant restraining webbing according to claim 1, wherein the overall denier of said warp is 360,000 to 490,000.

5. An improved occupant restraining webbing employed in a seatbelt system for a vehicle of the type having a warp and weft woven from polyester yarn, and having one end thereof wound up on a takeup shaft which is stopped from rotating when a vehicular emergency situation occurs, thereby preventing said webbing from being further wound off, wherein said yarn forming said warp has a dry tenacity of 8.8 gr/De or more, a denier of 1,700 De or less and a twist multiplier of 3,100 to 5,500, in order to reduce the extra amount by which said webbing is undesirably wound off at the time of a vehicular emergency as a result of the compressibility of the webbing.

6. An occupant restraining webbing according to claim 5, wherein said warp has an elongation of 4 to 8% and an overall denier of 360,000 to 490,000.

7. An occupant restraining webbing according to claim 5, wherein said twist multiplier is preferably 3,500 to 5,500.

8. An occupant restraining webbing according to claim 5, wherein said warp has an elongation of 4 to 8%.

9. An occupant restraining webbing according to claim 5, wherein said warp has an overall denier of 360,000 to 490,000.

10. An improved webbing for use in a vehicular seatbelt system having a webbing retractor, said webbing being of the type formed by weaving together a warp and a weft made from polyester yarn, wherein said warp yarn has the following properties in order to reduce the extra amount by which said webbing is undesirably wound off:
   (a) a dry tenacity of 8.8 gr/De or more;
   (b) a denier of 1,700 De or less;
   (c) a twist multiplier of 3,100 to 5,500;
   (d) an elongation of 4 to 8%; and wherein said warp has
   an overall denier of 360,000 to 490,000.

* * * * *

UNITED STATES PATENT AND TRADEMARK OFFICE
CERTIFICATE OF CORRECTION

PATENT NO. : 4,664,333
DATED : May 12, 1987
INVENTOR(S) : Yasuo Inada; Koko Sato; Takazo Fujii; Hideo Yokoyama;
Akiro Nagawa; Shoichi Takahashi; Kiyoshi Mizutani; Takayoshi Kawashima;

It is certified that error appears in the above-identified patent and that said Letters Patent are hereby corrected as shown below:

On the Title Page:

Item [73] Assignee: Kabushiki Kaisha Toka-rika-denki-seisakusho, Aichi, Japan

Toyoda Bohshoki Kabushiki Kaisha, Aichi, Japan

Hoshino Kougiyo Co., Ltd., Niigata, Japan

Signed and Sealed this

Eighth Day of September, 1987

Attest:

DONALD J. QUIGG

Attesting Officer

Commissioner of Patents and Trademarks

UNITED STATES PATENT AND TRADEMARK OFFICE
CERTIFICATE OF CORRECTION

PATENT NO. : 4,664,333

DATED : May 12, 1987

INVENTOR(S) : Yasuo Inada; Koki Sato; Takazo Fujii; Hideo Yokoyama; Akira Nagawa; Shoichi Takahashi; Kiyoshi Mizutani; Takayoshi Kawashima It is certified that error appears in the above-identified patent and that said Letters Patent is hereby corrected as shown below:

On the Title Page:

Item [73] Assignee: Kabushiki Kaisha Tokai-rika-denki-seisakusho, Aichi, Japan

Toyoda Bohshoku Kabushiki Kaisha, Aichi, Japan

Hoshino Kougiyo Co., Ltd., Niigata, Japan

This certificate supercedes Certificate of Correction issued September 8, 1987.

Signed and Sealed this

Eleventh Day of October, 1988

Attest:

DONALD J. QUIGG

Attesting Officer

Commissioner of Patents and Trademarks